(12) United States Patent
Chung et al.

(10) Patent No.: US 10,382,372 B1
(45) Date of Patent: Aug. 13, 2019

(54) PROCESSING MEDIA CONTENT BASED ON ORIGINAL CONTEXT

(71) Applicant: Snap Inc., Venice, CA (US)

(72) Inventors: Ken Chung, Los Angeles, CA (US); Rong Yan, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 93 days.

(21) Appl. No.: 15/499,035

(22) Filed: Apr. 27, 2017

(51) Int. Cl.
*H04L 12/58* (2006.01)
*G06F 3/0484* (2013.01)
*G06F 16/48* (2019.01)

(52) U.S. Cl.
CPC ............ *H04L 51/08* (2013.01); *G06F 3/0484* (2013.01); *G06F 16/489* (2019.01)

(58) Field of Classification Search
CPC ... H04L 51/08; G06F 3/0484; G06F 17/30044
See application file for complete search history.

(56) References Cited

U.S. PATENT DOCUMENTS

| | | | |
|---|---|---|---|
| 6,038,295 A | 3/2000 | Mattes | |
| 6,501,911 B1 | 12/2002 | Desormeaux | |
| 6,980,909 B2 | 12/2005 | Root et al. | |
| 7,173,651 B1 | 2/2007 | Knowles | |
| 7,209,571 B2 * | 4/2007 | Davis | G06F 21/10 |
| | | | 382/100 |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,467,601 B2 | 6/2013 | Daisy | |
| 8,712,192 B2 * | 4/2014 | Thota | G06F 17/30241 |
| | | | 358/403 |

(Continued)

FOREIGN PATENT DOCUMENTS

CA 2887596 A1 7/2015

OTHER PUBLICATIONS

"Photoshop User Guide", [Online]. Retrieved from the Internet:<URL:https://helpx.adobe.com/photoshop/user-guide.html>, (accessed Jul. 27, 2017), 3 pgs.

(Continued)

*Primary Examiner* — Blake J Rubin
(74) *Attorney, Agent, or Firm* — Schwegman Lundberg & Woessner, P.A.

(57) ABSTRACT

Systems and methods provide, for capturing a media content item at a first time period and detecting and storing context data for the media content item. The systems and methods further provide for receiving, at a second time period, an indication from a user to access the media content item, retrieving the media content item and the context data for the media content item, analyzing the context data for the media content item to determine that creative tools not available during the second time period were available during the first time period based on the context data for the media content item, and providing creative tools to the user comprising the creative tools that were available during the first time period. The systems and methods further provide for storing recorded user actions and creative tools applied to the media content item separately from the media content item.

20 Claims, 9 Drawing Sheets

(56) References Cited

U.S. PATENT DOCUMENTS

| | | | |
|---|---|---|---|
| 8,718,333 B2 | 5/2014 | Wolf et al. | |
| 8,724,622 B2 | 5/2014 | Rojas | |
| 8,810,599 B1* | 8/2014 | Tseng | G06T 7/0018 |
| | | | 340/435 |
| 8,874,677 B2 | 10/2014 | Rosen et al. | |
| 8,909,679 B2 | 12/2014 | Root et al. | |
| 8,995,433 B2 | 3/2015 | Rojas | |
| 9,020,832 B2* | 4/2015 | Fisher | G06Q 30/02 |
| | | | 705/14.1 |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |
| 9,459,778 B2* | 10/2016 | Hogeg | H04N 21/47205 |
| 9,489,661 B2 | 11/2016 | Evans et al. | |
| 9,491,134 B2 | 11/2016 | Rosen et al. | |
| 10,074,400 B2* | 9/2018 | Bonhomme | G11B 27/031 |
| 2008/0098432 A1 | 4/2008 | Hardacker et al. | |
| 2009/0012944 A1* | 1/2009 | Rodriguez | G06F 17/30864 |
| 2009/0097815 A1* | 4/2009 | Lahr | G11B 27/034 |
| | | | 386/278 |
| 2009/0260060 A1* | 10/2009 | Smith | G06Q 10/10 |
| | | | 726/3 |
| 2011/0202598 A1 | 8/2011 | Evans et al. | |
| 2012/0209924 A1 | 8/2012 | Evans et al. | |
| 2012/0233531 A1* | 9/2012 | Ma | G06F 17/30265 |
| | | | 715/205 |
| 2013/0129252 A1* | 5/2013 | Lauper | G06F 17/30041 |
| | | | 382/276 |
| 2013/0194438 A1* | 8/2013 | Sweet, III | G06K 9/00221 |
| | | | 348/207.1 |
| 2013/0297468 A1* | 11/2013 | Hirsch | G06Q 40/00 |
| | | | 705/32 |
| 2013/0332834 A1* | 12/2013 | Li | G06F 17/30817 |
| | | | 715/719 |
| 2014/0236720 A1* | 8/2014 | Shunock | G06Q 30/02 |
| | | | 705/14.54 |
| 2014/0328570 A1* | 11/2014 | Cheng | G11B 27/10 |
| | | | 386/241 |
| 2014/0378810 A1* | 12/2014 | Davis | G06T 5/40 |
| | | | 600/407 |
| 2015/0016661 A1* | 1/2015 | Lord | H04N 21/42203 |
| | | | 382/100 |
| 2015/0042823 A1* | 2/2015 | Relf | H04L 51/10 |
| | | | 348/207.1 |
| 2015/0163311 A1* | 6/2015 | Heath | G06Q 30/0201 |
| | | | 709/204 |
| 2015/0172335 A1* | 6/2015 | Sitrick | G06Q 10/101 |
| | | | 715/719 |
| 2015/0220558 A1* | 8/2015 | Snibbe | H04N 21/854 |
| | | | 707/627 |
| 2015/0227797 A1* | 8/2015 | Ko | G06K 9/00677 |
| | | | 348/207.1 |
| 2015/0242444 A1* | 8/2015 | Campbell | G06F 21/36 |
| | | | 348/207.1 |
| 2015/0244878 A1* | 8/2015 | Macauley | G06F 3/1204 |
| | | | 358/1.2 |
| 2016/0110030 A1* | 4/2016 | Bohi | G06F 3/0482 |
| | | | 715/753 |
| 2016/0149843 A1* | 5/2016 | Spicer | G06Q 10/101 |
| | | | 709/206 |
| 2016/0191453 A1* | 6/2016 | Thomas | H04W 4/12 |
| | | | 709/206 |
| 2016/0308945 A1* | 10/2016 | Zhang | G06F 21/604 |
| 2017/0010771 A1* | 1/2017 | Bernstein | G06F 1/165 |
| 2017/0098283 A1* | 4/2017 | Rajan | G06F 16/951 |
| 2017/0264578 A1* | 9/2017 | Allen | H04L 51/32 |
| 2017/0351417 A1* | 12/2017 | Manico | G06N 5/022 |
| 2018/0095960 A1* | 4/2018 | Tan | G06F 17/3028 |
| 2018/0143748 A1* | 5/2018 | Ahmed | H04N 21/4312 |
| 2018/0332446 A1* | 11/2018 | Seidman | G06Q 50/01 |

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

* cited by examiner

PROCESSING MEDIA CONTENT BASED ON ORIGINAL CONTEXT

BACKGROUND

A messaging system may receive millions of messages from users desiring to share media content such as audio, images, and video between user devices (e.g., mobile devices, personal computers, etc.). The media content of these messages may be associated with a particular time period, geolocation, event, and so forth.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to processing media content items to be shared between devices via a messaging system. For example, a user may capture media content such as video, images, and so forth and wish to share the media content with one or more other users. Example embodiments allow a user to capture a media content item, such as an image, video, and so forth, and store the captured media content. The context of the media content item at the time of capture will also be stored. For example, context information may comprise the time the media content item was captured, the date that the media content item was captured, a geolocation where the media content item was captured, weather information when the media content item was captured, an event associated with the media content item, and so forth.

In some examples, certain creative tools, (e.g., media overlays such as stickers, geofilters, speed filters, etc.) may only be available at the time the media content item is captured. For example, if a user is in Venice at a concert on a hot day, and is taking photographs and video at the concert, at the time the user is taking the photographs and video, he may be able to access special creative tools associated with the concert, weather, location, and so forth. If the user later, at home in San Francisco, goes back to those photographs and videos, the special creative tools associated with the concert, weather, location, and so forth, are no longer available since he is no longer in that location, with those weather conditions, and so forth. Accordingly, example embodiments allow context information at the time of capture of the media content item to be detected and stored. Later, this context data may be retrieved and analyzed to provide the user with creative tools associated with the context when the media content item was captured.

In other examples, after a user finishes applying creative tools to a photograph or video, he can send the photograph or video as a message to one or more other users. The message will be generated by applying the creative tools on the media content item and storing and sending the message as one file. Later if the user goes back to the media content item, he will not be able to alter the creative tools applied to the media content item. In example embodiments, the actions of the user using creative tools on the media content item are recorded. The actions and creative content tools applied to the media content are stored separately from the media content item (e.g., in separate files, as metadata, etc.). Later if the user desires to change the creative tools used on the media content item, he may do so by reversing actions, deleting things previously applied, adding new things, and so forth.

Figure 1:
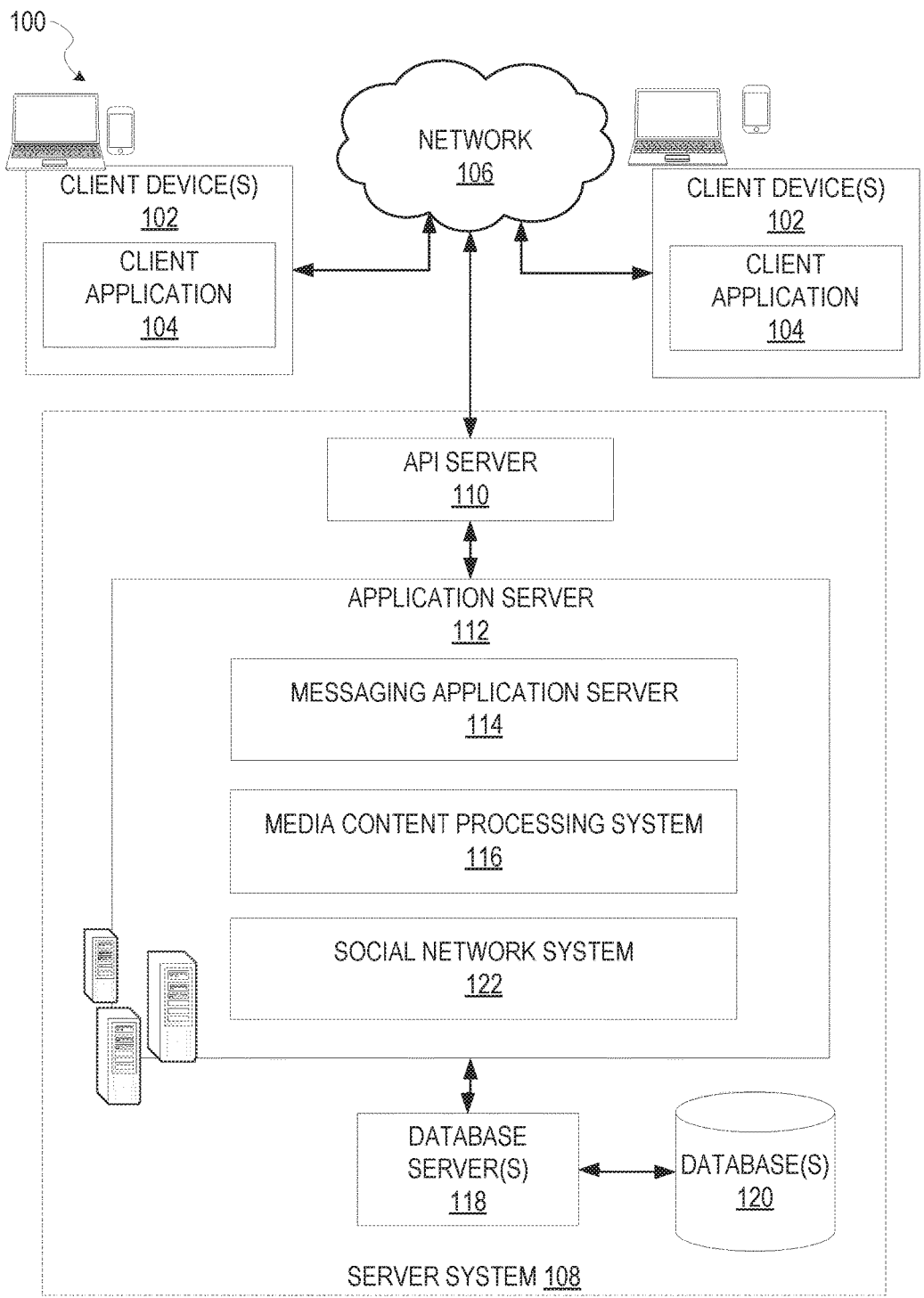
FIG. 1 is a block diagram showing an example messaging system for exchanging data (e.g., messages and associated content) over a network, according to some example embodiments.

FIG. 1 is a block diagram illustrating a networked system 100 (e.g., a messaging system) for exchanging data (e.g., messages and associated content) over a network. The networked system 100 includes multiple client devices 102, each of which hosts a number of client applications 104. Each client application 104 is communicatively coupled to other instances of the client application 104 and a server system 108 via a network 106.

The client device 102 may also be referred to herein as a user device or a computing device. The client device 102 may comprise, but is not limited to, a mobile phone, desktop computer, laptop, portable digital assistant (PDA), smart phone, tablet, ultra-book, netbook, laptop, multi-processor system, microprocessor-based or programmable consumer electronic, game console, set-top box, computer in a vehicle, or any other communication device that a user may utilize to access the networked system 100. In some embodiments, the client device 102 may comprise a display module (not shown) to display information (e.g., in the form of user interfaces). In further embodiments, the client device 102 may comprise one or more of touch screens, accelerometers, gyroscopes, cameras, microphones, global positioning system (GPS) devices, and so forth. The client device 102 may be a device of a user that is used to create media content items such as video, images (e.g., photographs), audio, and send and receive messages containing such media content items to and from other users.

One or more users may interact with the client device 102 (e.g., a person, a machine, or other means of interacting with the client device 102). In example embodiments, the user may not be part of the system 100, but may interact with the system 100 via the client device 102 or other means. For instance, the user may provide input (e.g., touch screen input or alphanumeric input) to the client device 102 and the input may be communicated to other entities in the system 100 (e.g., server system 108, etc.) via the network 106. In this instance, the other entities in the system 100, in response to receiving the input from the user, may communicate information to the client device 102 via the network 106 to be presented to the user. In this way, the user may interact with the various entities in the system 100 using the client device 102.

The system 100 may further include a network 106. One or more portions of network 106 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 102 may access the various data and applications provided by other entities in the system 100 via a web client (e.g., a browser, such as the Internet Explorer® browser developed by Microsoft® Corporation of Redmond, Wash. State) or one or more client applications 104. As described above, the client device 102 may include one or more client applications 104 (also referred to as "apps") such as, but not limited to, a web browser, messaging application, electronic mail (email) application, an e-commerce site application, a mapping or location application, media, content editing application, media content viewing application, and the like.

In one example, a client application 104 may be a messaging application that allows a user to take a photograph or video, add a caption, or otherwise edit the photograph or video, and then send the photograph or video to another user. The message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may, be viewed by other users "following" the user's gallery (e.g., subscribed to view and receive updates in the user's gallery). The gallery may also be ephemeral (e.g., lasting 24 hours, lasting for a duration of an event (e.g., during a music concert, sporting event, etc.), or other predetermined time).

An ephemeral message may be associated with a message duration parameter, the value of which determines an amount of time that the ephemeral message will be displayed to a receiving user of the ephemeral message by the client application 104. The ephemeral message may be further associated with a message receiver identifier and a message tinier. The message tinier may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users; for example, to assemble photographs and videos from a recent vacation to share with friends and family.

In some embodiments, the one or more client applications 104 may be included in a given one of the client device 102, and configured to locally provide the user interface and at least some of the functionalities with the application 104 configured to communicate with other entities in the system 100 (e.g., server system 108), on an as-needed basis, for data and/or processing capabilities not locally available (e.g., access location information, to authenticate a user, to verify a method of payment, access media content stored on a server, sync media content between the client device 102 and a server computer, determine context information for a media content item, etc.). Conversely, one or more applications 104 may not be included in the client device 102, and then the client device 102 may use its web browser to access the one or more applications hosted on other entities in the system 100 (e.g., server system 108).

A server system 108 may provide server-side functionality via the network 106 (e.g., the Internet or wide area network (WAN)) to one or more client devices 102. The server system 108 may include an application programming interface (API) server 110, an application server 112, a messaging application server 114, a media content processing system 116, and a social network system 122, which may each be communicatively coupled with each other and with one or more data storage(s), such as database(s) 120.

The server system 108 may be a cloud computing environment, according to some example embodiments. The server system 108, and any servers associated with the server system 108, may be associated with a cloud-based application, in one example embodiment. The one or more database(s) 120 may be storage devices that store information such as untreated media content, original media content from users (e.g., high-quality media content), processed media content (e.g., media content that is formatted for sharing with client devices 102 and viewing on client devices 102), context data related to a media content item, user information, user device information, and so forth. The one or more database(s) 120 may include cloud-based storage external to the server system 108 (e.g., hosted by one or more third party entities external to the server system 108). While the storage devices are shown as database(s) 120, it is understood that the system 100 may access and store data in storage devices such as databases 120, blob storages, and other type of storage methods.

Accordingly, each client application 104 is able to communicate and exchange data with another client applications 104 and with the server system 108 via the network 106. The data exchanged between client applications 104, and between a client application 104 and the server system 108, includes functions (e.g., commands to invoke functions) as well as payload data (e.g., text, audio, video or other multimedia data).

The server system 108 provides server-side functionality via the network 106 to a particular client application 104. While certain functions of the system 100 are described herein as being performed by either a client application 104 or by the server system 108, it will be appreciated that the location of certain functionality, either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 supports various services and operations that are provided to the client application 104. Such operations include transmitting data to, receiving data from, and processing data generated by the client application 104. This data may include message content, client device information, geolocation information, media annotation and overlays, message content persistence conditions, social network information, live event information, date and time stamps, as examples. Data exchanges within the networked system 100 are invoked and controlled through functions available via user interfaces (UIs) of the client application 104.

In the server system 108, an application program interface (API) server 110 is coupled to, and provides a programmatic interface to, an application server 112. The application server 112 is communicatively coupled to a database server 118, which facilitates access to one or more database(s) 120 in which is stored data associated with messages processed by the application server 112.

The API server 110 server receives and transmits message data (e.g., commands and message payloads) between the client device 102 and the application server 112. Specifically, the API server 110 provides a set of interfaces (e.g., routines and protocols) that can be called or queried by the client application 104 in order to invoke functionality of the application server 112. The API server 110 exposes various functions supported by the application server 112, including account registration; login functionality; the sending of messages, via the application server 112, from a particular client application 104 to another client application 104; the sending of media files (e.g., images or video) from a client application 104 to the messaging application server 114, and for possible access by another client application 104; the setting of a collection of media data (e.g., a story); the retrieval of a list of friends of a user of a client device 102; the retrieval of such collections; the retrieval of messages and content; the adding and deletion of friends to a social graph, the location of friends within a social graph; opening an application event (e.g., relating to the client application 104), and so forth.

The application server 112 hosts a number of applications and subsystems, including a messaging application server 114, a media content processing system 116, and a social network system 122. The messaging application server 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging application server 114, to the client application 104. Other processor- and memory-intensive processing of data may also be performed server-side by the messaging application server 114, in view of the hardware requirements for such processing.

The application server 112 also includes a media content processing system 116 that is dedicated to performing various media content processing operations, typically with respect to images or video received within the payload of a message at the messaging application server 114. The media content processing system 116 may access one or more data storages (e.g., database(s) 120) to retrieve stored data to use in processing media content and to store results of processed media content.

The social network system 122 supports various social networking functions services, and makes these functions and services available to the messaging application server 114. To this end, the social network system 122 maintains and accesses an entity graph 304 (depicted in FIG. 3) within the database 120. Examples of functions and services supported by the social network system 122 include the identification of other users of the networked system 100 with which a particular user has relationships or is "following," and also the identification of other entities and interests of a particular user.

The messaging application server 114 may be responsible for generation and delivery of messages between users of client devices 102. The messaging application server 114 may utilize any one of a number of message delivery networks and platforms to deliver messages to users. For example, the messaging application server 114 may deliver messages using electronic mail (e-mail), instant message (IM), Short Message Service (SMS), text, facsimile, or voice (e.g., Voice over IP (VoIP)) messages via wired (e.g., the Internet), plain old telephone service (POTS), or wireless networks (e.g., mobile, cellular, WiFi, Long Term Evolution (LTE), Bluetooth).

Figure 2:
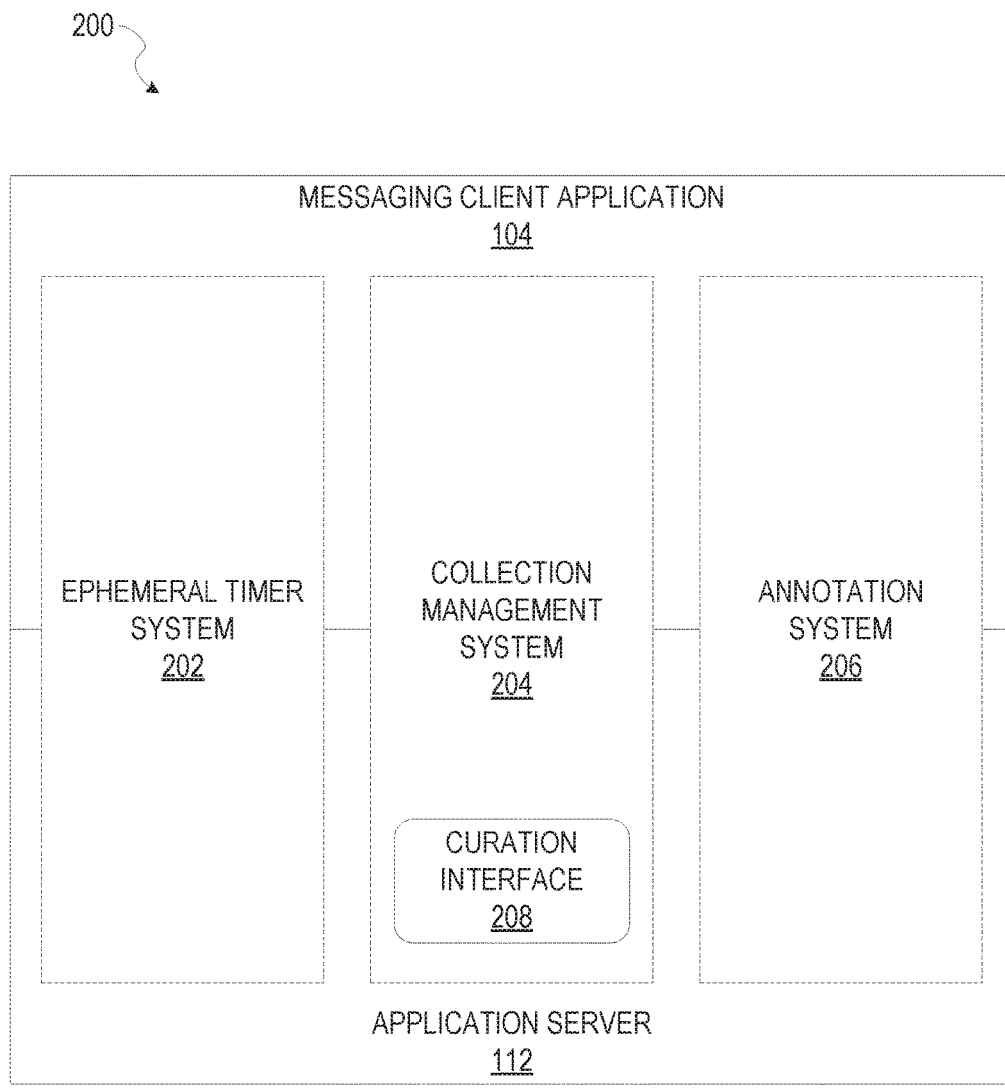
FIG. 2 is block diagram illustrating further details regarding a messaging system, according to some example embodiments.

FIG. 2 is block diagram illustrating further details regarding the system 100, according to example embodiments. Specifically, the system 100 is shown to comprise the messaging client application 104 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 104 and the messaging application server 114. To this end, the ephemeral timer system 202 incorporates a number of timers that, based on duration and display parameters associated with a message, or collection of messages (e.g., a SNAPCHAT Story), selectively display and enable access to messages and associated content via the messaging client application 104.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the communication system or a third party reward system, travel miles, access to artwork or specialized lenses, etcetera) may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

Figure 3:
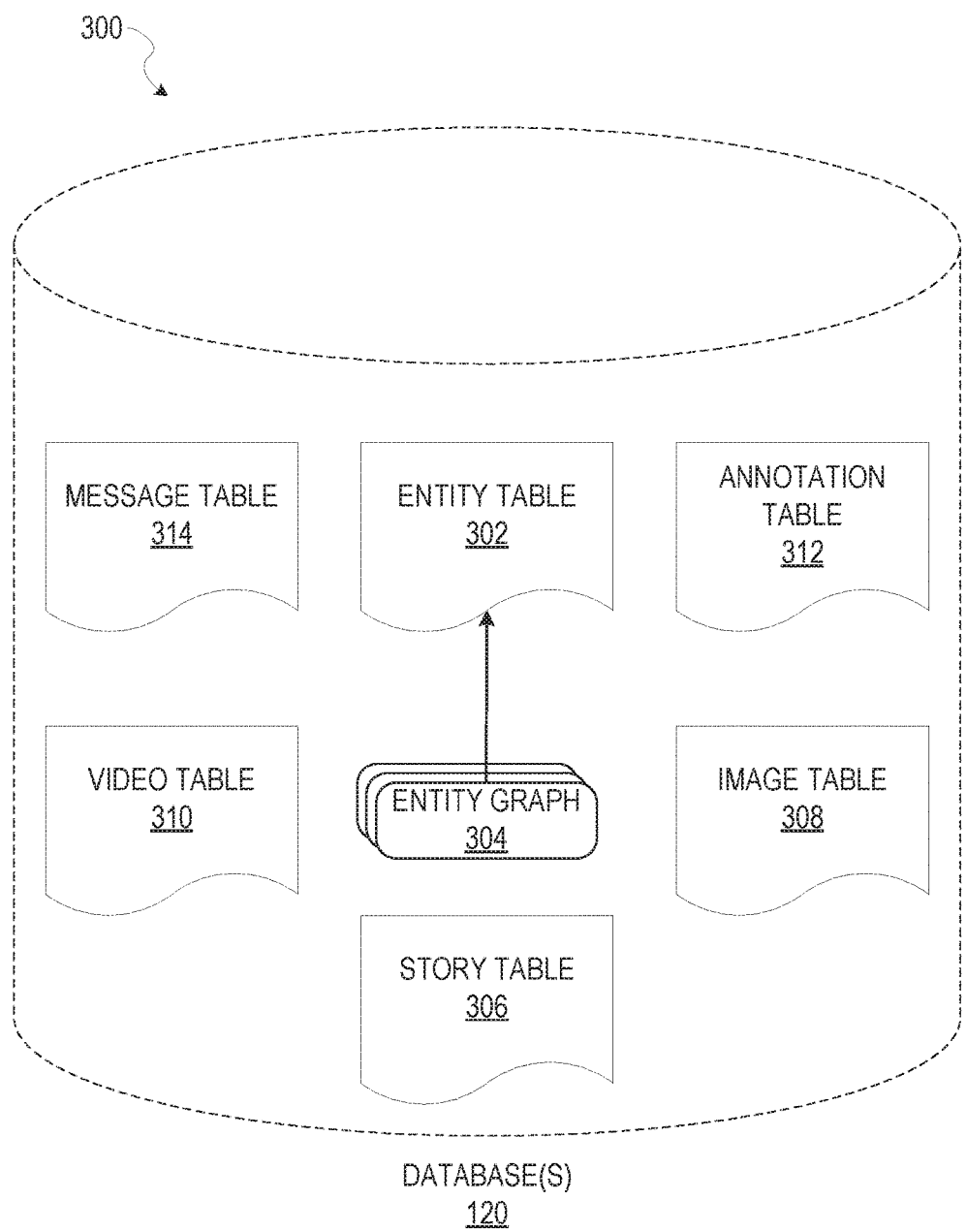
FIG. 3 is a schematic diagram illustrating data which may be stored in the database of the messaging server system, according to some example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data which may be stored in the database(s) 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Annotation data may also be referred to herein as "creative tools." Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may, be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may, constitute a curated stream of user-submitted content from various locations and events. Users, whose client devices 102 have location services enabled and are at a common location event at a particular time, may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
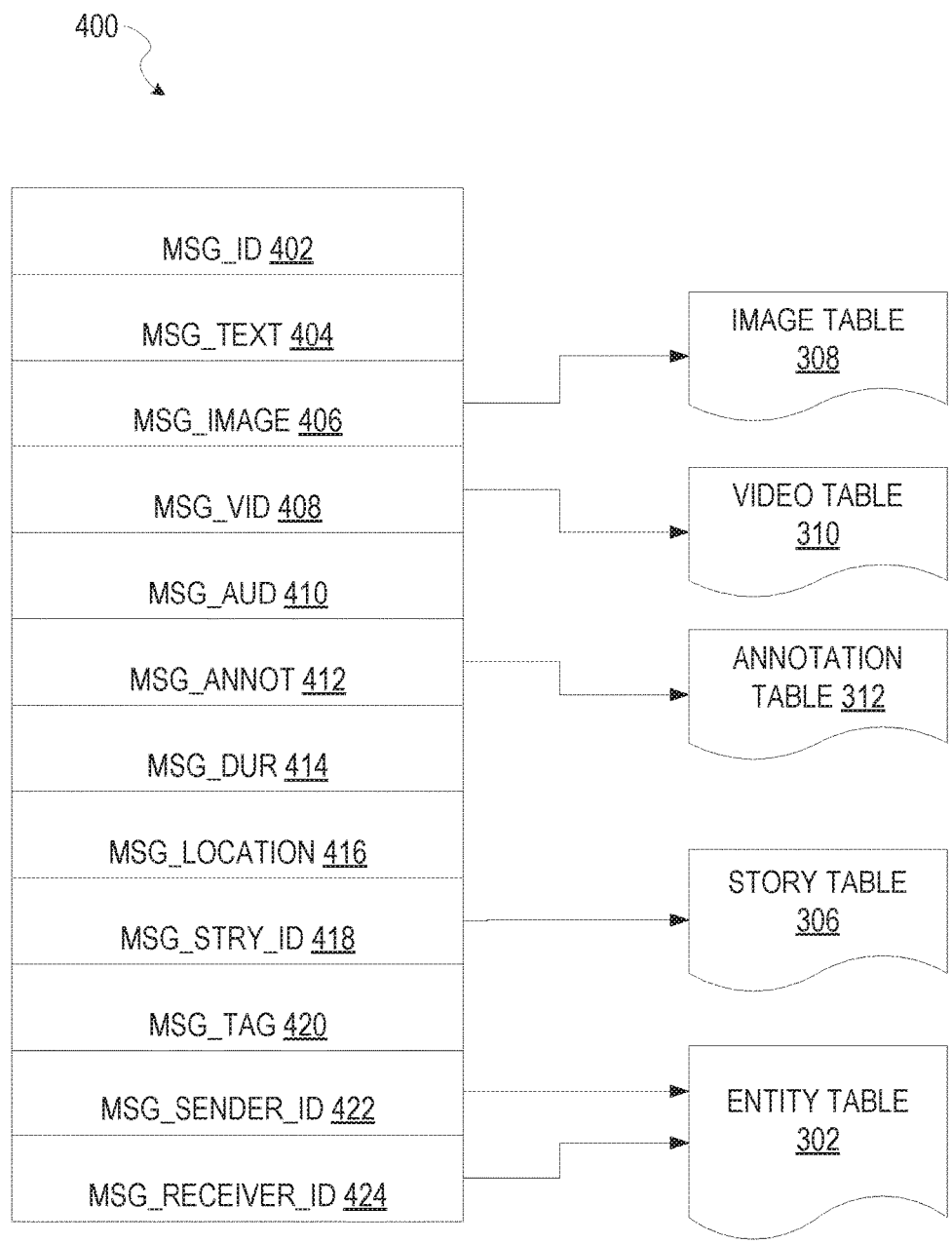
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a client application 104 for communication to a further client application 104 or the messaging application server 114. The content of a particular message 400 is used to populate the message table 314 stored within the database 120, accessible by the messaging application server 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message 400 (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message 400. Multiple message geolocation parameter 416 values may be included in the payload, each of these parameter values being associated with respect to content items included in the content (e.g., a specific image within the message image payload 406, or a specific video in the message video payload 408).
- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may, be automatically generated using, for example, image recognition.
- A message sender identifier 422: an identifier (e.g., a messaging system identifier, email address or device identifier) indicative of a user of the client device 102 on which the message 400 was generated and from which the message 400 was sent.
- A message receiver identifier 424: an identifier (e.g., a messaging system identifier, email address or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
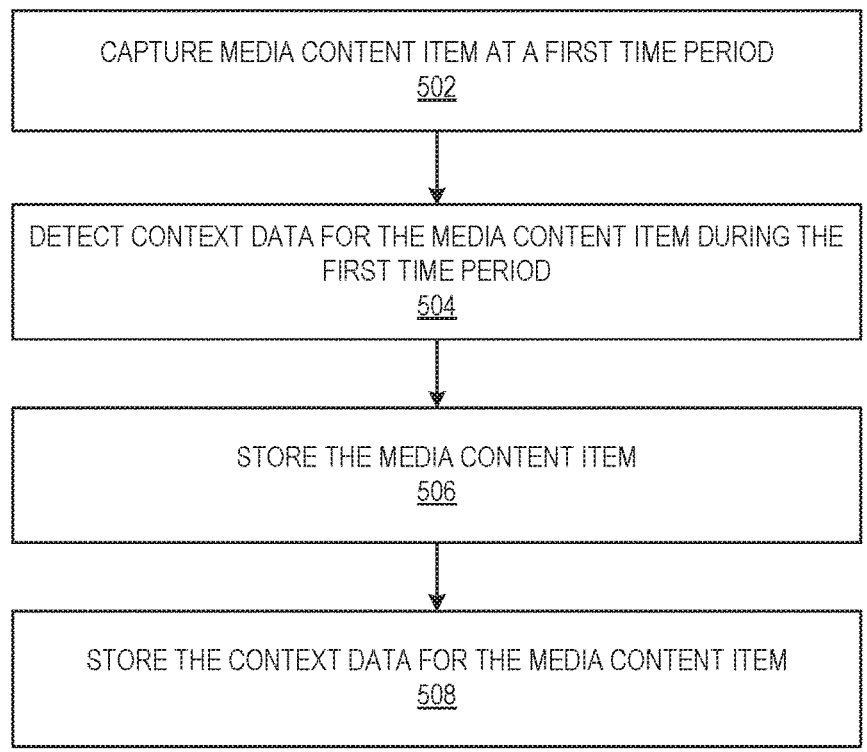
FIG. 5 is a flowchart illustrating aspects of a method, according to some example embodiments.

FIG. 5 is a flow chart illustrating aspects of a method 500, according to some example embodiments, for detecting and storing context data for a media content item captured at a first time period. For illustrative purposes, method 500 is described with respect to the networked system 100 of FIG. 1. It is to be understood that method 500 may be practiced with other system configurations in other embodiments.

In operation 502, a computing device (e.g., client device 102) captures a media content item at a first time period. For example, a user may be taking a photograph or video using the computing device. The time period may be the point at which the media content item is captured by the computing device.

In operation 504, the computing device detects context data for the media content item during the first time period when the media content item is captured. For example, the computing device may detect a time of capture of the media content item, a date of capture of the media content item, a geolocation of the computing device during capture of the media content item, accelerometer data, gyroscope data, an altitude of the computing device, weather data at the time of capture of the media content item, event data associated with the media content item, a speed of the computing device during capture of the media content item, and so forth. In addition, the computing device may determine context data from the media content item itself using object recognition, lighting recognition, and other technologies. For example, the computing device may determine whether the media content item was captured inside or outside, identify people or other objects in the media content item, and so forth.

In another example, the computing device may query server system 108 to determine further context data based on time of capture, date of capture, geolocation, and so forth. For example, the computing device may send detected context data to the server system 108. The server system 108 may receive the context data and use the context data to determine a particular stadium for an event, a score of a game, a song that is playing at a music event, and so forth. The server system 108 may return the additional context data to the computing device. In another example, the server system 108 may store the additional context data in one or more databases 120.

In operation 506, the computing device stores the media content item. In operation 508, the computing device stores the context data for the media content item. For example, the computing device may store the media content item and context data for the media content item in memory on the computing device, in cloud storage, in one or more databases 120 associated with server system 108, and so forth. The media content item may be stored in a variety of media format, such as, Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG)), and so forth. Context data may be saved as a structured metadata format, such as JavaScript Object Notation (JSON), Extensible Markup Language (XML), Protocol Buffers (protobuf), and so forth. In this way, a user may take a photograph or video using his computing device, and store the photograph or video to his computing device.

Figure 6:
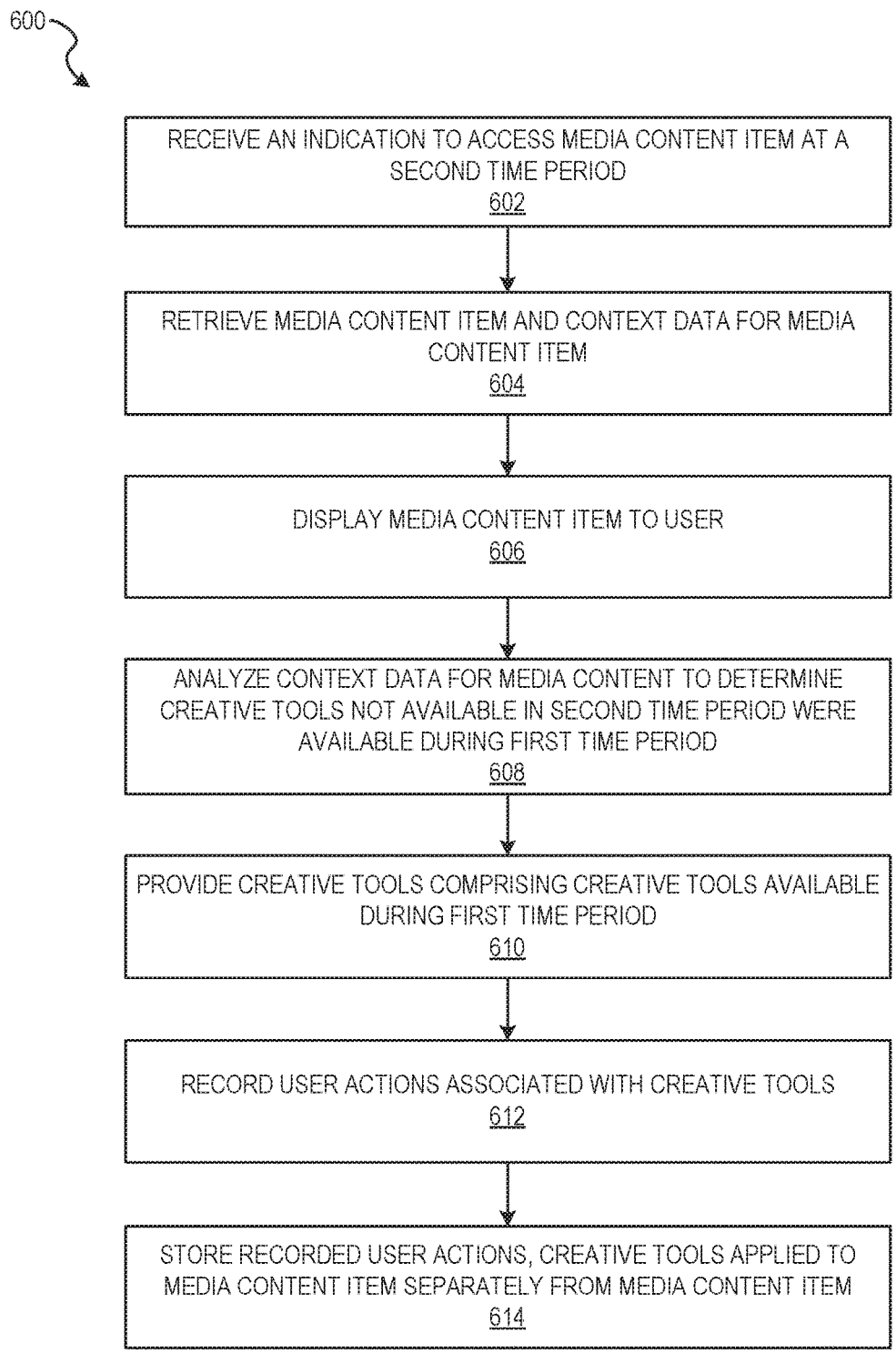
FIG. 6 is a flowchart illustrating aspects of a method, according to some example embodiments.

FIG. 6 is a flow chart illustrating aspects of a method 600, according to some example embodiments, for processing a media content item based on the original context of the media content item. For illustrative purposes, method 600 is described with respect to the networked system 100 of FIG. 1. It is to be understood that method 600 may be practiced with other system configurations in other embodiments.

In operation 602, the computing device receives an indication from the user to access the media content item, at a second time period that is different from the first time period when the media content item was captured. For example, the user may capture the media content item while at a sporting event in the evening. The next day while at home he may want to view the media content item and/or edit the media content item, and share it with other users.

In operation 604, the computing device retrieves the media content item and the context data for the media content item. For example, the computing device may retrieve the media content item and the context data for the media content item from memory of the computing device, from cloud storage, from one or more databases 120 associated with server system 108, or the like. In operation 606, the computing device displays the media content item to the user (e.g., via a graphical user interface of the computing device).

In operation 608, the computing device analyzes the context data for the media content item to determine that creative tools (e.g., media overlays, etc., as described above) not available during the second time period were available during the first time period based on the context data for the media content item. For example, the computing device may determine what creative tools were available based on the time of day the media content item was captured, the weather during the time when the media content item was captured, and so forth. For instance, a user may have captured the media content item while on a trip to Venice and has since traveled home to San Francisco. There may be special geofilters or weather-based creative content, in one example, that are available when a user (e.g., computing device) is located in Venice on a warm sunny day that would not be available when the user (e.g., computing device) is located in San Francisco on a cool foggy day.

Accordingly, the computing device may analyze the context data to determine whether creative tools were available based on the first time period, a geolocation of the computing device during the first time period, a weather condition during the first time period, a specific event associated with the media content item, a specific event associated with a geolocation during the first time period, a particular speed of the computing device during the first time period, an altitude of the computing device during the first time period, a date associated with the first time period, a time associated with the first time period, or other context data. Thus, the creative tools are provided to the user even though the creative tools are not available during the second time period.

The computing device may analyze the context data locally, or may send the context data to server system 108 and the server system 108 (e.g., via media content processing system 116) may analyze the context data to determine what creative tools were available based on the first time period, a geolocation of the computing device during the first time period, a weather condition during the first time period, a specific event associated with the media content item, a specific event associated with a geolocation during the first time period, a particular speed of the computing device during the first time period, an altitude of the computing device during the first time period, a date associated with the first time period, a time associated with the first time period, and other context data. In another example, the server system 108 may store the context data and thus, may access the stored context data (e.g., in one or more databases 120) to analyze the context data. The server system 108 may return the context data to the computing device and/or the creative tools themselves or an indication of what creative tools should be made available, as described below.

In operation 610, the computing device provides creative tools to the user comprising the creative tools that were only available during the first time period. For example, the computing device may provide creative tools that are generally available (e.g., not tied or dependent on particular context, such as time, date, weather, etc.), provide creative tools dependent on the context during the second time period, and provide creative tools that were only available during the first time period.

In one example, the creative tools are available locally on the computing device and can be presented to the user via a graphical user interface (GUI) (e.g., via a menu or other method of allowing a user to choose from various creative tools to apply). In another example, the computing device may request particular creative tools from a server system, such as server system 108. For instance, the computing device may request specific creative tools from the server system 108 and receive them from the server system 108 to be presented to the user via the GUI.

In another example, the computing device may send context data to the server system 108 and receive the creative tools associated with the context data from the server system 108. In this example, the context data may include the original context data saved when the media content item was captured in the first time period, and context data during the second time period. The server system 108 may analyze the context data to determine applicable creative tools and send creative tools back to the computing device, or may just send instructions back to the computing device that instructs the computing device which creative tools should be provided.

Figure 7:
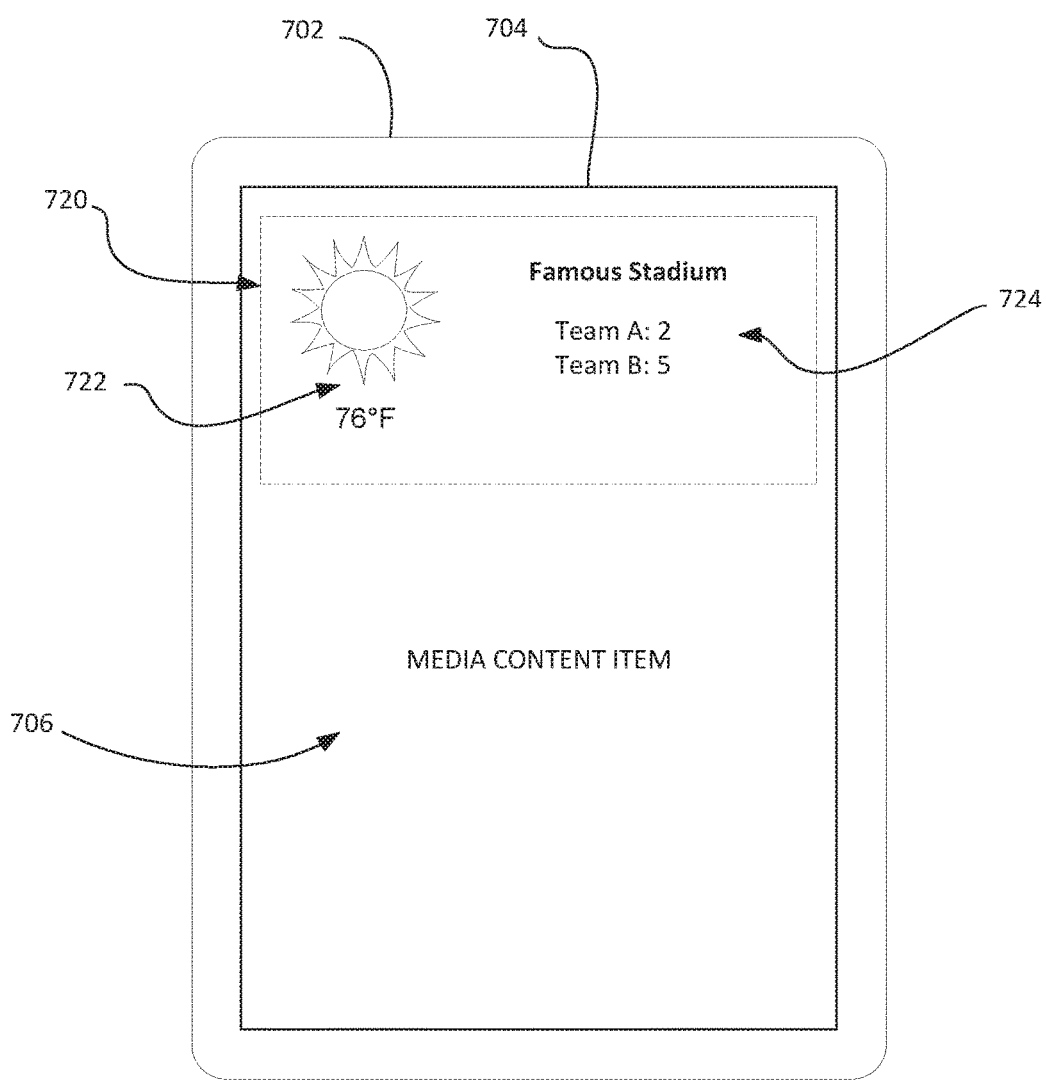
FIG. 7 illustrates an example user interface of a computing device, according to some example embodiments.

The user may then use the creative tools to make edits to the media content item. FIG. 7 illustrates an example display 704 of a computing device 702. In this example, computing device 702 (or server system 108) may determine, based on the context data, the weather at the time the media content item 706 was captured (e.g., the first time period), a location of the computing device 702 at the first time period, a sporting event associated with the media content item 706, and other data associated with the event (e.g., score). Accordingly, the computing device 702 may make a media overlay 720 accessible to the user, and when the user applies it to the media content item 706, it may display the weather 722 and location/score 724 associated with the event.

Referring again to FIG. 6, in operation 612, the computing device records user actions associated with the creative tools applied to the media content item by the user. In one example, recording the user actions comprises recording each action the user makes in applying or removing creative tools to the media content item. This recording may be used in the future to remove applied creative tools, replay to revert actions, and so forth. In one example, user actions may be saved as a set of operations in a structured metadata format such as JavaScript Object Notation (JSON), Extensible Markup Language (XML), Protocol Buffers (protobuf), and so forth.

In operation 614, the computing device stores the user actions and creative tools applied to the media content item, separately from the media content item. In one example, the computing device may also store a thumbnail version of the media content item that comprises the media content item and the creative tools applied to the media content item.

The user may wish to share the media content item with other users. For example, the user may want to send the media content item to one or more other users. The user may select an option to send the media content item via a GUI of the computing device. The computing device may receive the request to send the media content item to one or more users, generate a message comprising the media content item and creative tools applied to the media content item in a single media content item file, and send the message to the one or more users. The message may be an ephemeral message, as described above.

The user may access the media content item again in the future to further edit the media content item (e.g., add or remove creative tools), and the user may save changes made and send the updated media content item to one or more users. For example, the computing device may receive an indication from the user to access the media content item at a third time period. The computing device may retrieve the media content item and the context data for the media content item. The computing device may display the media content item to the user. The computing device may analyze the context data for the media content item to determine that creative tools not available during the third time period were available during the first time period based on the context data for the media content item. The computing device may provide creative tools to the user comprising the creative tools that were available during the first time period. The user may add, remove, or otherwise edit the media content item using the creative tools. The computing device may record user actions associated with the creative tools applied to the media content item by the user, and store the recorded user actions and creative tools applied to the media content item separately from the media content item.

In one example, the recorded user actions, creative content tools applied to the media content item, and the media content item file are stored as part of a message collection (e.g., a gallery or story as described above).

Figure 8:
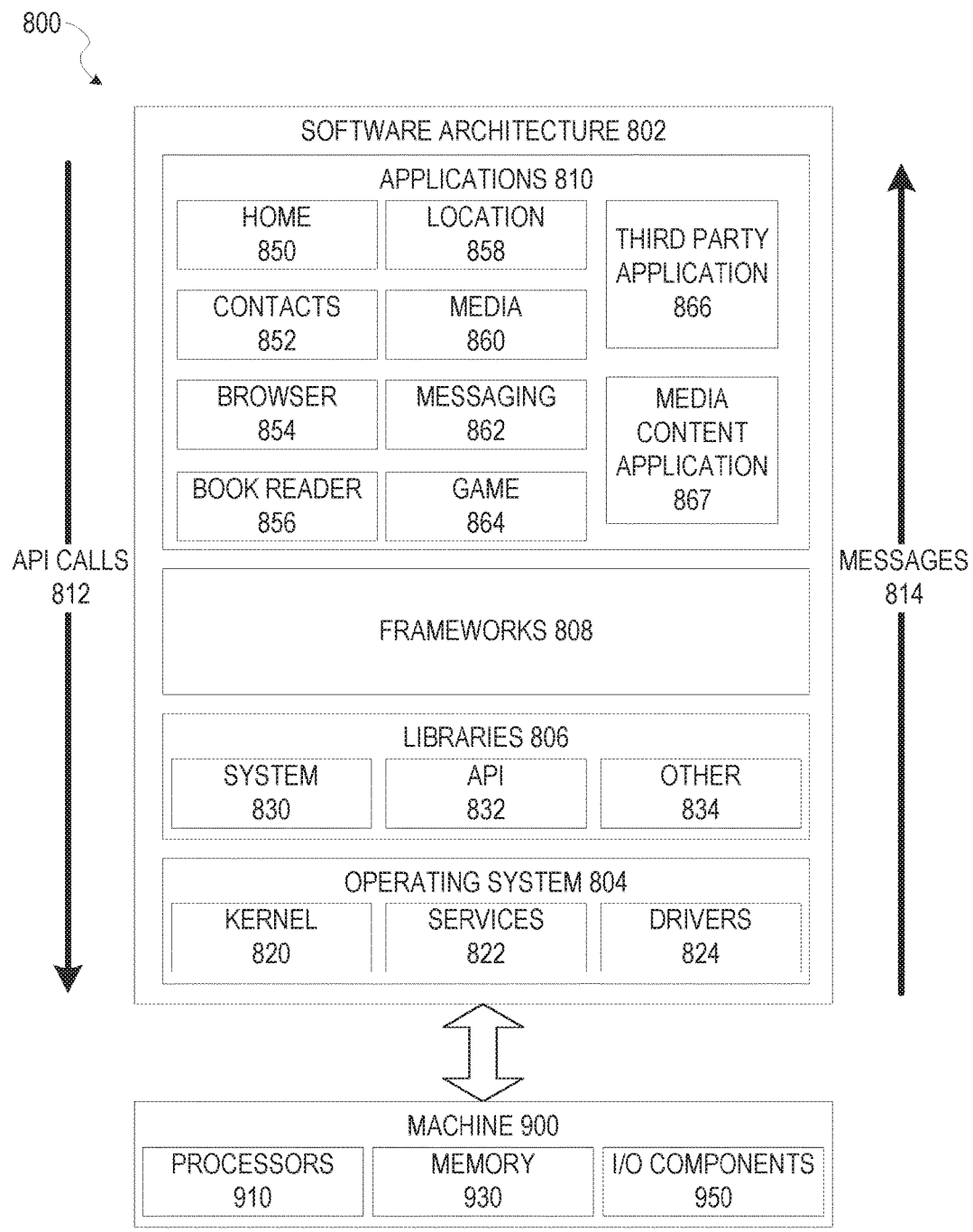
FIG. 8 is a block diagram illustrating an example of a software architecture that may be installed a machine, according to some example embodiments.

FIG. 8 is a block diagram 800 illustrating software architecture 802, which can be installed on any one or more of the devices described above. For example, in various embodiments, client devices 102 and server system 108, including server systems 110, 112, 114, 116, 118, and 122, may be implemented using some or all of the elements of software architecture 802. FIG. 8 is merely a non-limiting example of a software architecture, and it will be appreciated that many other architectures can be implemented to facilitate the functionality described herein. In various embodiments, the software architecture 802 is implemented by hardware such as machine 1000 of FIG. 9 that includes processors 910, memory 930, and I/O components 950. In this example, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications such as a third party application 866 and media content application 867. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 866 can invoke the API calls 812 provided by the operating system 804 to facilitate functionality, described herein.

As explained above, some embodiments may particularly include a messaging application 862. In certain embodiments, this may be a stand-alone application that operates to manage communications with a server system such as server system 108. In other embodiments, this functionality may be integrated with another application such as a media content application 867. Messaging application 862 may request and display various media content items and may provide the capability for a user to input data related to media content items via a touch interface, keyboard, or using a camera device of the machine 1000, may provide the capability for communication with a server system 108 via I/O components 1050, and may provide the capability for receipt and storage of media content items in memory 1030. Presentation of media content items and user inputs associated with media content items may be managed by the messaging application 862 using different frameworks 808, library 806 elements, or operating system 804 elements operating on a machine 1000.

Figure 9:
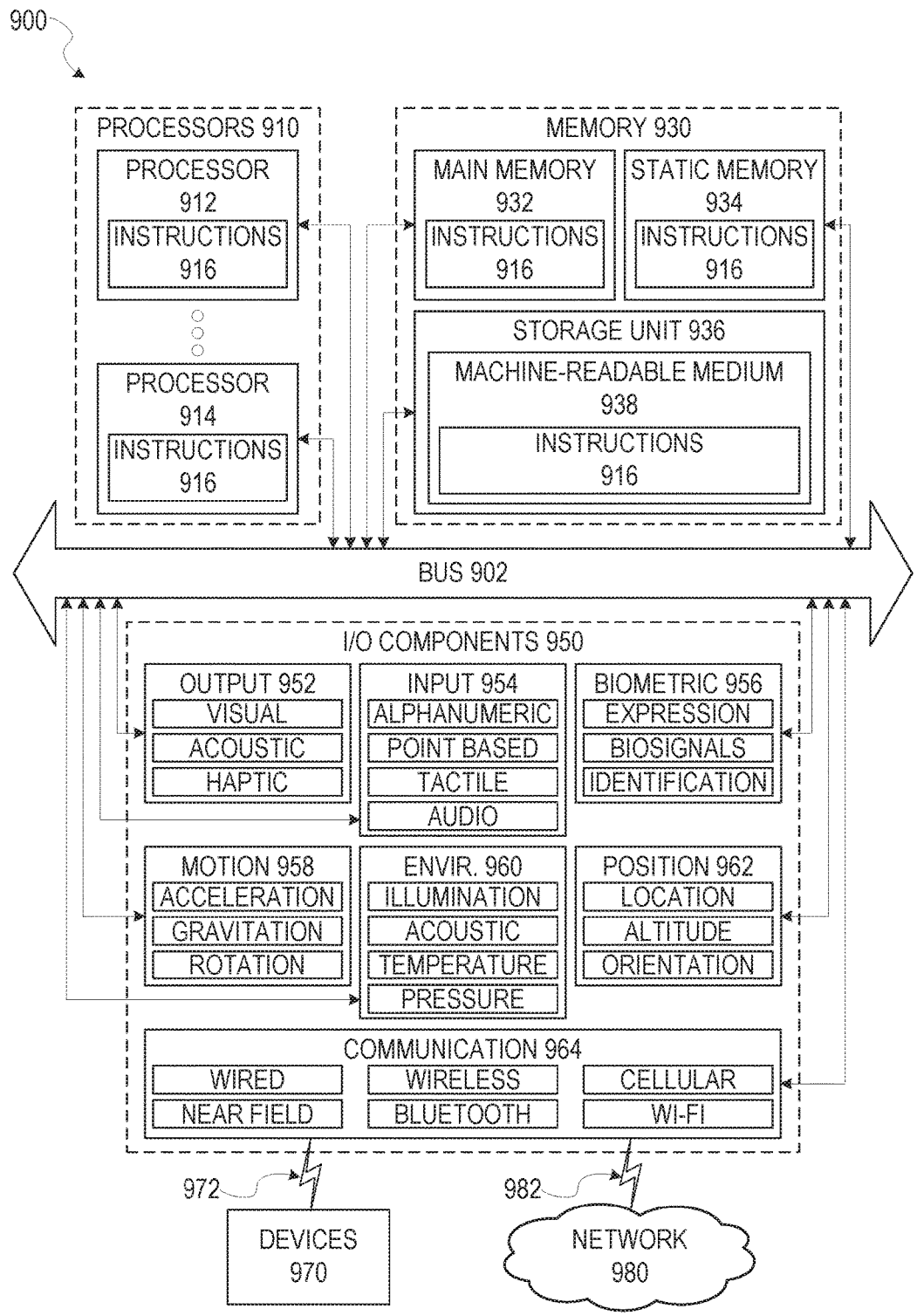
FIG. 9 illustrates a diagrammatic representation of a machine, in the form of a computer system, within which a set of instructions may be executed for causing the machine to perform any one or more of the methodologies discussed herein, according to an example embodiment.

FIG. 9 is a block diagram illustrating components of a machine 900, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application 810, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server system 108, 110, 112, 114, 116, 118, 122, etc., or a client device 102 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 9 shows multiple processors 910, the machine 900 may include a single processor 910 with a single core, a single processor 910 with multiple cores (e.g., a multi-core processor 910), multiple processors 912, 914 with a single core, multiple processors 912, 914 with multiples cores, or any, combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NEC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra. Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NEC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium 938 should be considered as being transportable from one physical location to another. Additionally, since the machine-readable medium 938 is tangible, the medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed. Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    capturing, at a computing device, a media content item at a first time period;
    detecting, by the computing device, context data for the media content item during the first time period when the media content item is captured;
    storing, by the computing device, the media content item and the context data for the media content item;
    receiving, at a second time period, by the computing device, an indication from a user to access the media content item;
    retrieving, by the computing device, the media content item and the context data for the media content item;
    displaying, by the computing device, the media content item to the user;
    analyzing, by the computing device, the context data for the media content item to determine a first set of creative tools that are not available during the second time period but were available during the first time period based on the context data for the media content item;
    providing to the user, by the computing device, creative tools comprising the first set of creative tools that were available during the first time period but not available during the second time period;
    recording, by the computing device, each action performed by the user in applying or removing one or more of the first set of creative tools to the media content item; and
    storing, by the computing device, the recorded user actions and the one or more of the first set of creative tools applied to the media content item separately from the media content item.

2. The method of claim 1, wherein the context data detected during the first time period comprises at least one of a group comprising: a time of capture of the media content item, a date of capture of the media content item, a geolocation of the computing device during capture of the media content item, accelerometer data, gyroscope data, an altitude of the computing device, weather data at the time of capture of the media content item, event data associated with the media content item, and a speed of the computing device during capture of the media content item.

3. The method of claim 1, wherein analyzing the context data for the media content item to determine that a first set of creative tools that are not available during the second time period but were available during the first time period based on the context data for the media content item, further comprises:
    analyzing the context data to determine whether the first set of creative tools were available based one of a group comprising: the first time period, a geolocation of the computing device during the first time period, a weather condition during the first time period, a specific event associated with the media content item, a specific event associated with a geolocation during the first time period, a particular speed of the computing device during the first time period, an altitude of the computing device during the first time period, a date associated with the first time period, and a time associated with the first time period.

4. The method of claim 1, wherein the first set of creative tools are provided to the user even though the first set of creative tools are not available during the second time period.

5. The method of claim 1, wherein the user is a first user and the method further comprises:
  generating an ephemeral message comprising the media content item and the one or more of the first set of creative tools applied to the media content item in a single media content item file; and
  sending the ephemeral message to a second user.

6. The method of claim 1, further comprising:
  storing a thumbnail version of the media content item that comprises the media content item and the one or more of the first set of creative tools applied to the media content item.

7. The method of claim 1, further comprising:
  receiving, at a third time period, an indication from the user to access the media content item;
  retrieving the media content item and the context data for the media content item;
  displaying the media content item to the user;
  analyzing, by the computing device, the context data for the media content item to determine that creative tools not available during the third time period were available during the first time period based on the context data for the media content item;
  providing, by the computing device, creative tools to the user comprising the creative tools that were available during the first time period;
  recording, by the computing device, user actions associated with the creative tools applied to the media content item by the user; and
  storing, by the computing device, the recorded user actions and creative tools applied to the media content item separately from the media content item.

8. The method of claim 1, wherein the recorded user actions, the one or more of the first set of creative tools applied to the media content item, and the media content item file are stored as part of a message collection.

9. A server computer comprising:
  a memory that stores instructions; and
  one or more processors configured by the instructions to perform operations comprising:
  capturing a media content item at a first time period;
  detecting context data for the media content item during the first time period when the media content item is captured;
  storing the media content item and the context data for the media content item;
  receiving, at a second time period, an indication from a user to access the media content item;
  retrieving the media content item and the context data for the media content item;
  displaying the media content item to the user;
  analyzing the context data for the media content item to determine a first set of creative tools that are not available during the second time period but were available during the first time period based on the context data for the media content item;
  providing to the user, creative tools comprising the first set of creative tools that were available during the first time period but not available during the second time period;
  recording each action performed by the user in applying or removing one or more of the first set of creative tools to the media content item; and
  storing the recorded user actions and the one or more of the first set of creative tools applied to the media content item separately from the media content item.

10. The server computer of claim 9, wherein the context data detected during the first time period comprises at least one of a group comprising: a time of capture of the media content item, a date of capture of the media content item, a geolocation of the computing device during capture of the media content item, accelerometer data, gyroscope data, an altitude of the computing device, weather data at the time of capture of the media content item, event data associated with the media content item, and a speed of the computing device during capture of the media content item.

11. The server computer of claim 9, wherein analyzing the context data for the media content item to determine that a first set of creative tools that are not available during the second time period but were available during the first time period based on the context data for the media content item, further comprises:
  analyzing the context data to determine whether the first set of creative tools were available based on one of a group comprising: the first time period; a geolocation of the computing device during the first time period, a weather condition during the first time period, a specific event associated with the media content item, a specific event associated with a geolocation during the first time period, a particular speed of the computing device during the first time period, an altitude of the computing device during the first time period, a date associated with the first time period, and a time associated with the first time period.

12. The server computer of claim 9, wherein the first set of creative tools are provided to the user even though the first set of creative tools are not available during the second time period.

13. The server computer of claim 9, wherein the user is a first user and the operations further comprise:
  generating an ephemeral message comprising the media content item and the one or more of the first set of creative tools applied to the media content item in a single media content item file; and
  sending the ephemeral message to a second user.

14. The server computer of claim 9, the operations further comprising:
  storing a thumbnail version of the media content item that comprises the media content item and the one or more of the first set of creative tools applied to the media content item.

15. The server computer of claim 9, the operations further comprising:
  receiving, at a third time period, an indication from the user to access the media content item;
  retrieving the media content item and the context data for the media content item;
  displaying the media content item to the user;
  analyzing the context data for the media content item to determine that creative tools not available during the third time period were available during the first time period based on the context data for the media content item;

providing creative tools to the user comprising the creative tools that were available during the first time period;
recording user actions associated with the creative tools applied to the media content item by the user; and
storing the recorded user actions and the creative content tools applied to the media content item separately from the media content item.

16. The server computer of claim 9, wherein the recorded user actions, the one or more of the first set of creative tools applied to the media content item, and the media content item file are stored as part of a message collection.

17. A non-transitory computer-readable medium comprising instructions stored thereon that are executable by at least one processor to cause a computing device to perform operations comprising:
capturing a media content item at a first time period;
detecting context data for the media content item during the first time period when the media content item is captured;
storing the media content item and the context data for the media content item;
receiving, at a second time period, an indication from a user to access the media content item;
retrieving the media content item and the context data for the media content item;
displaying the media content item to the user;
analyzing the context data for the media content item to determine a first set of creative tools that are not available during the second time period but were available during the first time period based on the context data for the media content item;
providing to the user, creative tools comprising the first set of creative tools that were available during the first time period but not available during the second time period;
recording each action performed by the user in applying or removing one or more of the first set of creative tools to the media content item; and
storing the recorded user actions and the one or more of the first set of creative tools applied to the media content item separately from the media content item.

18. The non-transitory computer-readable medium of claim 17, wherein analyzing the context data for the media content item to determine that a first set of creative tools that are not available during the second time period but were available during the first time period based on the context data for the media content item, further comprises:
analyzing the context data to determine whether the first set of creative tools were available based on one of a group comprising: the first time period, a geolocation of the computing device during the first time period, a weather condition during the first time period, a specific event associated with the media content item, a specific event associated with a geolocation during the first time period, a particular speed of the computing device during the first time period, an altitude of the computing device during the first time period, a date associated with the first time period, and a time associated with the first time period.

19. The method of claim 1, wherein the media content item comprising the one or more of the first set of tools applied to the media content item is added to a media collection accessible by a plurality of computing devices.

20. The method of claim 1, wherein the media content item comprising the one or more of the first set of tools applied to the media content item is added as an ephemeral message to a media collection accessible by a plurality of computing devices.

* * * * *

UNITED STATES PATENT AND TRADEMARK OFFICE
CERTIFICATE OF CORRECTION

PATENT NO. : 10,382,372 B1
APPLICATION NO. : 15/499035
DATED : August 13, 2019
INVENTOR(S) : Chung et al.

Page 1 of 1

It is certified that error appears in the above-identified patent and that said Letters Patent is hereby corrected as shown below:

In the Claims

In Column 21, Line 63, in Claim 9, after "content", insert --item--

In Column 22, Line 29, in Claim 11, delete "period;" and insert --period,-- therefor Signed and Sealed this
Nineteenth Day of May, 2020

Andrei Iancu
*Director of the United States Patent and Trademark Office*